United States Patent
Scheer et al.

(10) Patent No.: US 9,781,203 B2
(45) Date of Patent: Oct. 3, 2017

(54) DATA SYNCHRONIZATION

(71) Applicant: Hewlett-Packard Development Company, L.P., Houston, TX (US)

(72) Inventors: Roque Luis Scheer, Porto Alegre (BR); Mauricio Nunes Porto, Porto Alegre (BR); Soma Sundaram Santhiveeran, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 166 days.

(21) Appl. No.: 14/763,458

(22) PCT Filed: Feb. 27, 2013

(86) PCT No.: PCT/US2013/027848
§ 371 (c)(1),
(2) Date: Jul. 24, 2015

(87) PCT Pub. No.: WO2014/133489
PCT Pub. Date: Sep. 4, 2014

(65) Prior Publication Data
US 2015/0358406 A1    Dec. 10, 2015

(51) Int. Cl.
*G06F 15/16* (2006.01)
*H04L 29/08* (2006.01)
(Continued)

(52) U.S. Cl.
CPC .......... *H04L 67/1095* (2013.01); *G06F 11/30* (2013.01); *G06F 11/3058* (2013.01);
(Continued)

(58) Field of Classification Search
CPC . H04L 67/2847; H04L 29/0881; H04L 67/22; H04L 67/1078; H04L 67/1095;
(Continued)

(56) References Cited

U.S. PATENT DOCUMENTS 6,556,573 B1    4/2003    Kaaresoja
7,793,002 B2    9/2010    Hieb
(Continued)

FOREIGN PATENT DOCUMENTS

CN    01500208    8/2009
CN    101833562    9/2010
(Continued)

OTHER PUBLICATIONS

Muthusrinivasan et al, "Optimizing the Update Packet Stream for Web Applications," Oct. 2010, pp. 1-18 dejanseo.com.au/research/google.
(Continued)

*Primary Examiner* — Ruolei Zong
(74) *Attorney, Agent, or Firm* — HP Inc. Patent Department

(57) ABSTRACT

An example for synchronizing data in accordance with aspects of the present disclosure includes monitoring a set of attributes at a plurality of devices on a network, selecting a group of data based on the monitored set of attributes for synchronization, assigning priority levels to each selected data and each device, prioritizing synchronization operations to be performed on the group of selected data based on the priority levels, and synchronizing the group of selected data in accordance with the prioritization of the synchronization.

19 Claims, 4 Drawing Sheets

(51) Int. Cl.
  *G06F 11/30* (2006.01)
  *G06F 17/30* (2006.01)
  *G06F 11/34* (2006.01)
  *G06F 11/20* (2006.01)

(52) U.S. Cl.
  CPC .......... *G06F 11/3438* (2013.01); *G06F 17/30* (2013.01); *G06F 11/2097* (2013.01); *Y02B 60/165* (2013.01)

(58) Field of Classification Search
  CPC ................ G06F 12/0862; G06F 17/30; G06F 17/30017; G06F 17/30073; G06F 17/30132; G06F 11/30; G06F 11/3058; G06F 11/3438; G06F 11/2097
  USPC ........................................................ 709/248
  See application file for complete search history.

(56) References Cited

U.S. PATENT DOCUMENTS

| | | |
|---|---|---|
| 8,312,096 B2 | 11/2012 | Cohen et al. |
| 9,448,961 B1 * | 9/2016 | Cohen .................... G06F 15/16 |
| 2005/0147130 A1 | 7/2005 | Hurwitz et al. |
| 2008/0140941 A1 * | 6/2008 | Dasgupta .......... G06F 17/30132 711/137 |
| 2009/0006308 A1 * | 1/2009 | Fonsen ............. G06F 17/30902 |
| 2009/0300169 A1 | 12/2009 | Sagar et al. |
| 2010/0257474 A1 | 10/2010 | Bochatay et al. |
| 2011/0125924 A1 | 5/2011 | McAleer |
| 2012/0227064 A1 | 9/2012 | Neill |

FOREIGN PATENT DOCUMENTS

| | | |
|---|---|---|
| CN | 101933013 | 12/2010 |
| CN | 102064932 | 5/2011 |
| JP | 2003-030037 | 1/2003 |
| JP | 2004-094577 | 3/2004 |
| JP | 2008-282295 | 11/2008 |
| JP | 2009-524889 | 7/2009 |
| JP | 2009-230207 | 10/2009 |
| JP | 2010-211425 | 9/2010 |
| JP | 2011-198071 | 10/2011 |
| JP | 5180360 B2 | 1/2013 |
| KR | 1020020084966 A | 11/2002 |
| KR | 1020110081867 A | 7/2011 |
| TW | 201106172 | 2/2011 |
| WO | WO-02/052368 A2 | 7/2002 |
| WO | WO-2008/022973 A1 | 2/2008 |
| WO | WO-2009063034 | 5/2009 |
| WO | WO-2012/015920 A2 | 2/2012 |

OTHER PUBLICATIONS

PCT Search Report/Written Opinion~Application No. PCT/US2013/027848 dated Nov. 27, 2013~9 pages.

Tae-Young Chang, "User-Activity Aware Strategies for Mobile Information Access," Thesis, Georgia Institute of Technology, Apr. 2008, pp. 1-144.

* cited by examiner

DATA SYNCHRONIZATION

BACKGROUND

Content such as media files and documents may be created or acquired by users using multiple devices. On occasion, a user may desire to synchronize, transfer, upload or otherwise send content from one device to another. The content may be shared among users' other devices in a network in order to be readily consumed or edited when needed. For example, a user may decide to acquire a new mobile telephone with more advanced features (e.g., photo editing, advanced network settings, etc.) and desire to transfer the photos from the old mobile telephone to the new one. In another example, a user may desire to synchronize the video links on his mobile phone with the video links on his desktop computer in order to, for example, view the videos on a larger screen.

Devices and communication networks facilitate the collection and exchange of information. Such devices may include personal computer including attached peripherals, handheld/palmtop devices, portable computer, and/or the like, to collect, synchronize, transfer or exchange a variety of content, such as files, patches, graphics, and/or the like. For example, the files may contain large amount of content such as videos, photos, music, and documents. Such content may be created on or downloaded to one device and then replicated to the other devices.

Synchronization frameworks allow various devices or appliances to send content from a device or synchronization servers and/or external partners over network connectivity, such as via Internet. Synchronization may be accomplished through triggering synchronization of the content upon a users request, periodic intervals, or in real-time. For example, the synchronization event can correspond to an expressed instruction or command issued by the user to synchronize information related to the content being presented (e.g., "record my last page read").

BRIEF DESCRIPTION OF THE DRAWINGS

Examples are described in the following detailed description and in reference to the drawings, in which.

DETAILED DESCRIPTION

Figure 1:
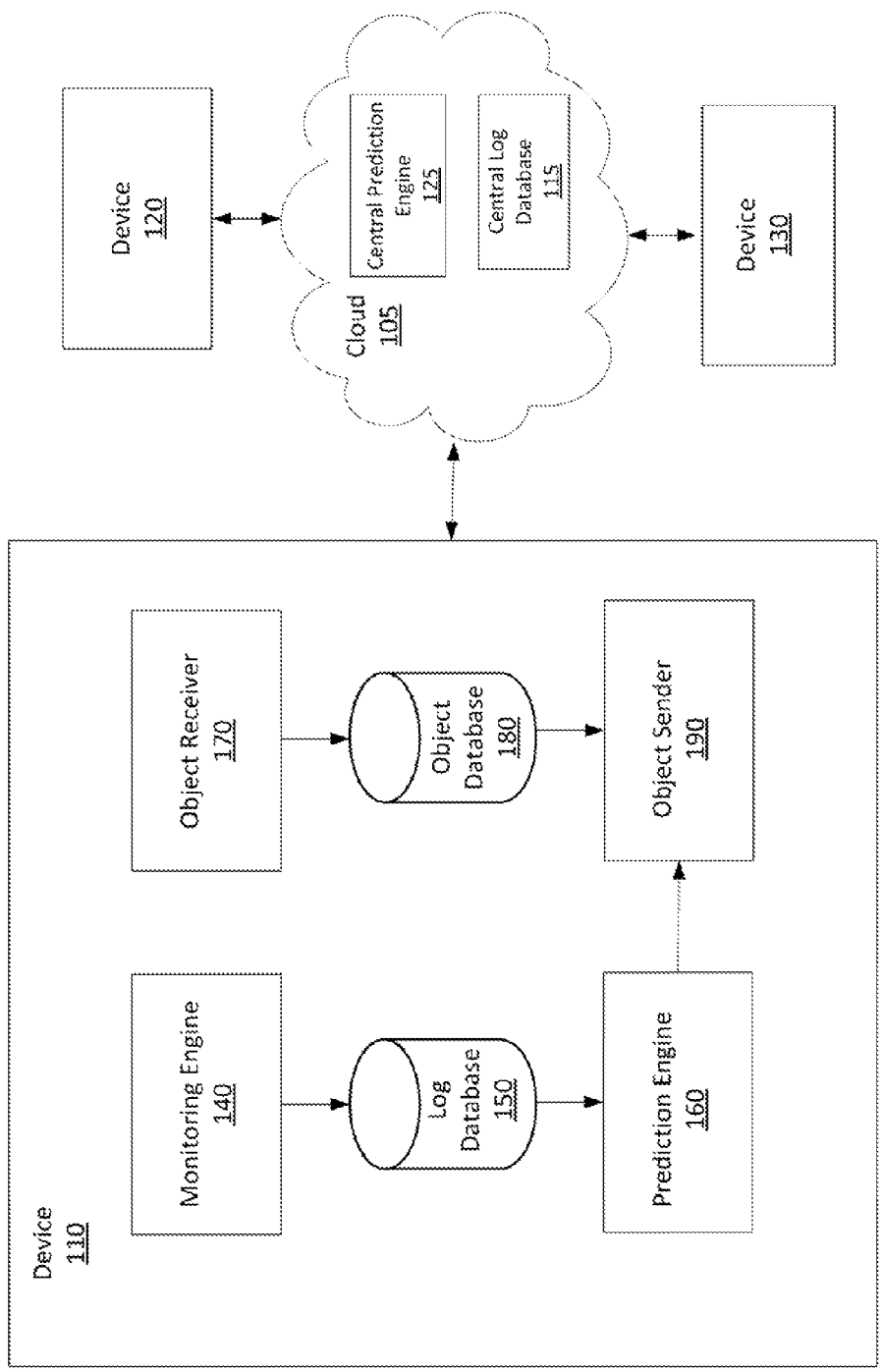
FIG. 1 illustrates an example system in accordance with an implementation.

Various aspects of the present disclosure are generally directed to content synchronization. More specifically, various aspects of the present disclosure are generally directed to a manner by which content across various devices is synchronized. This approach allows for synchronization of content by a content synchronization framework, in which any connected device or appliance, such as a personal computer (PC), portable device, personal digital assistant (PDA), tablet, smartphone, scientific instrument, point of sales device, or the like, performs contextual synchronization over a wide variety of communication network topologies including both wired and wireless connections.

Aspects of the present disclosure described herein predict groups of data to be transmitted from one machine to another. Moreover, other aspects of the present disclosure prioritize the data within each transmission based on user activity and system information at each device. Further, other aspects identify user actions that indicate that the user require immediate access to the data on a given device and accordingly, synchronize new or modified data, available on the other devices, to that device in order to make it available just in time when the user needs it.

Among other things, this approach may present an efficient and effective manner to synchronize data and prevent unavailability of user data at the time of need in addition to preventing depletion of battery and waste of resources. This approach may also remove the need for manual user trigger, requiring the user to synchronize manually while maintaining a good user experience.

In one example in accordance with the present disclosure, a method for synchronizing data is provided. The method comprises monitoring a set of attributes at a plurality of devices on a network, selecting a group of data based on the monitored set of attributes for synchronization, assigning priority levels to each selected data and each device, prioritizing synchronization operations to be performed on the group of selected data based on the priority levels, and synchronizing the group of selected data in accordance with the prioritization of the synchronization.

In another example in accordance with the present disclosure, a system is provided. The system comprises a monitoring module to monitor a set of attributes at a plurality of devices on a network, a prediction module to selecting a group of data based on the monitored set of attributes for synchronization and assign priority levels to each selected data and each device, a data manager to prioritize synchronization operations to be performed on the group of selected data based on the priority levels. The data manager also synchronizes the group of selected data in accordance with the prioritization of the synchronization.

In a further example in accordance with the present disclosure, a non-transitory computer readable medium is provided. The non-transitory computer-readable medium comprises instructions which, when executed, cause a device to (i) monitor a set of attributes at a plurality of devices on a network, (ii) select a group of data based on the monitored set of attributes for synchronization, (iii) prioritize synchronization operations to be performed on the group of selected data based on a priority level assigned to each selected data and each device, and (iv) synchronize the group of selected data in accordance with the prioritization of the synchronization.

FIG. 1 illustrates an example system 100 in accordance with an implementation. The system 100 may be a content synchronization system and may comprise a plurality of devices such as computing devices that are connected across a cloud-computing system or another network set-up. It should be readily apparent that the system 100 represents a generalized illustration and that other elements may be added or existing elements may be removed, modified, or rearranged without departing from the scope of the present disclosure. For example, while the system 100 illustrates that FIG. 1 includes devices 110, 120 and 130, the system may actually comprise less or more number of devices and three devices have been shown and described for simplicity.

The system 100 may be a peer-to-peer sharing environment, in which there may be distributed architecture without the need for central coordination, with user devices being at the same time both suppliers and consumers of objects. In another implementation, the system 100 may be a cloud-based sharing system, which uses computing resources (hardware and software) that are delivered as a service over a network (e.g., the Internet). The cloud-based system exposes data to be accessed by user devices as a service over a network, and accordingly the user devices may be connected to each other through the cloud. The cloud is indicated in FIG. 1 by the cloud 105. The cloud 105 may replace, supplement, or blend with features and capabilities provided by applications and software that run locally. Applications may include, for example, one or more of identity and directory services, device management and security, synchronized storage and data services across multiple devices or platforms, and services pertaining to activities and news. The cloud 105 may be provided under a variety of different business models including free, advertising-supported, and subscription-based models.

Alternatively or in addition, communications medium between the user devices may include, but is not limited to, any combination of wired and/or wireless resources. For example, communications medium may include resources provided by any combination of cable television networks, direct video broadcasting networks, satellite networks, cellular networks, wired telephony networks and/or data networks, wireless data networks (e.g., wireless local area networks, wireless personal area networks, etc.), and so forth.

The system 100 comprises the devices 110, 120 and 130. The device 110 comprises a monitoring engine (or monitoring module) 140, a log database 150, a prediction engine (prediction module) 160, an object receiver 170, an object database 180, and an object sender 190, each of which is described in greater detail below. In one implementation, an object receiver and an object sender may be data modules. In another implementation, the system 100 may comprise a queue manager and a prioritization manager (not shown in FIG. 1).

The devices 110, 120 and 130 may encompass all wired devices and wireless devices. In one implementation, the device 110 may comprise a desktop computer, set-top box, game console, laptop computer, pocket PC, PDA, smart phone, mobile phone, tablet, portable media players such as MP3 players (Moving Pictures Expert Group, MPEG-1, audio layer 3), e-book reader, handheld game device, ultra-mobile computer, or device comprising a combination of features provided therefrom.

In one implementation, a user may have the device 110, which may be a personal computer, the device 120, which may be a laptop computer, and the device 130, which may be a mobile device. The devices may be viewed as peer devices on a mesh where data may be moved across the devices (i.e., fetched). In another implementation, all devices may be arranged to connect to one another through the cloud 105. Depending on the implementation, security features/tools may be implemented in various ways such as by a firewall, one time passwords, encryption programs, digital certificates, user application security, etc. Various combinations of these and/or other security features may be used. In one implementation, these security approaches may be layered to provide a highly secure environment in which one device may interact with another. For example, the security features may require a user to log in before transferring data from one device to another. In other implementations, the security features may require the user to provide the user's credentials or identity which is trusted by the cloud 105 for transferring data over the cloud 105.

The devices 110, 120 and 130 may have differing features and capabilities. For example, the desktop computer and laptop computer may utilize different operating systems, respectively, including the Microsoft Windows operating system and the Apple Mac OS operating system. Alternatively or in addition, one device may be configured with fewer resources such as processing power, memory, and storage compared to the other devices.

For purposes of illustrative examples, the devices 110, 120 and 130 may correspond to, respectively, a desktop computer, a laptop and a mobile device. Each device stores objects (e.g., content). Such objects may include various forms of user perceptible content. Exemplary objects can refer to any object that can be directly or indirectly accessed by a user, including, but not limited to, multi-media data, digital images, digital video (e.g., television programming and movies), displayable text, audio data, electronic documents, electronic publications, computer-executable code, portions of the above, and/or the like. Further, the presentation of the content may vary as a function of the capabilities and configuration of the devices 110, 120 and 130 (e.g., a portable e-book reader vs. a mobile phone) and the format of the content (e.g., a digital publication vs. a video).

In one implementation, the devices 110, 120 and 130 associated with a user or a user account may have access to different representations of the content provided by content providers. For example, the device 110 may correspond to a desktop computer that has obtained a digital representation of content (e.g., a digital publication that can be presented on a computer) via a communication network (e.g., a wireless communication network). The device 120 may correspond to a laptop that has obtained a separate representation of the same content (e.g., a copy of the digital publication that can be presented on a laptop) via the same or a different communication network. Still further, the device 130 may correspond to a mobile device that has also obtained a separate representation of the same content (e.g., a copy of the digital publication that can be presented on a mobile device) from the same or a different communication network.

In another implementation, the devices 110, 120 and 130 may have different representations of the same content stored in each device. For example, the device 110 may correspond to a desktop computer that has a digital representation of content (e.g., a digital photograph that can be presented on a computer). The device 120 may correspond to a laptop that has a separate representation of the same content (e.g., a copy of the digital photograph that can be presented on a laptop). Still further, the device 130 may correspond to a mobile device that has also a separate representation of the same content (e.g., a copy of the photograph that can be presented on a mobile device).

In one implementation, a user of the device 110 may manually select content. This selection may involve the user browsing listings of content stored in the device 110. Alternatively or in addition, a user of the device 110 may request to obtain content from another device or a content provider through the cloud 105. The content provider may include any entities that can provide content for consumption by the user devices. Examples of content providers may include (but are not limited to) television broadcast stations, servers, peer-to-peer networking entities (e.g., other user devices 120, 130), and/or alike. Further, content can be variety of content such as files, patches, graphics, and/or the like. The files may include videos, audios and/or text.

The monitoring engine 140 may comprise collecting data related to operations and actions of the system, data that can be used to infer user activity in the network, as well as data that explicitly indicates activity. For example, the monitoring engine 140 may monitor content that is output by a user. Further, the monitoring engine 140 may collect data related to the presentation of content to the user via the device 110, and/or user content selection, which indicates content that the user has requested to receive and selected for output (e.g., viewing and/or listening). For example, the user may browse the files in the "My Project" folder on his desktop. The user may then start up a word processing application and begin to make edits to a particular file in the folder. The monitoring engine 140 may monitor such user activity on the device 110 and based on such activity, the monitoring engine 140 may generate user activity data, which may then be stored in the log database 150 and shared with the prediction engine 160.

Moreover, the monitoring engine 140 may monitor application data and track the data that the applications access. Applications may include any of a variety of typical applications that may run on a device to enhance productivity (e.g., word processing, spreadsheets), support communications (e.g., e-mail, web-browsing, and instant messaging), provide entertainment (e.g., games, multimedia players), and/or the like.

In another implementation, the monitoring engine 140 may monitor system information related to the device 110. Such system information may include various attributes of the device 110, including. The attributes may be static or dynamic. For example, dynamic attributes may include, but not limited to, battery power information, battery power consumption rates, memory/storage space, wireless signal strength, network details, overall device health information, device or ambient temperature values, and/or the like. The information can also include information related to the status of various input or output devices or information regarding a change in status of input or output devices. For example, the device information can include data indicative of the connection of the device 110 to another device (e.g., via a Bluetooth wireless connection or hardwire connection). Similarly, the device information can include an identification of any software application having functionality to present content to a user. In an illustrative implementation, the device information may be generated by hardware components (e.g., sensors) or software components on the device 110. Additionally, the device information may be obtained by the device 110 from external resources, such as attached hardware components, remote monitoring components/services or network data sources.

In one implementation, the device information can correspond to information (such as latitude and longitude information or other geographic coordinate information) from a global positioning system ("GPS") or cellular positioning system (e.g., triangulation). In one implementation, a GPS received signal from a GPS antenna may be processed by a GPS receiving part and may be input into the monitoring engine 140. The location information of the device 110 may be interpreted and translated into user behavior data that may be used to predict a set of content the user may need to access at that location. For example, the system may detect that the user is at a library, and that the past user behavior shows that the user accesses the image files in a "My Photos" folder in the user's laptop when the user is at the library. Accordingly, the monitoring engine 140 may collect the information about the user's location in addition to the user's past and/or present behavior associated with the location and deliver it to the prediction engine 160. After analyzing the information, the prediction engine 160 may predict the objects the user may choose to access on the users laptop at the library, which, for example, may be the image files in the "My Photos" folder in the user's laptop.

In another implementation, the types of data being monitored may vary based on device type. A device can identify specific types of data that should be monitored for determining synchronization events or establishing thresholds for establishing synchronization events, or both. These types of data may be classified as the constraints events. For example, based on these types of data, the monitoring engine may detect patterns that indicate heavy usage of local resources (e.g., low battery, low network bandwidth, high network traffic). Accordingly, the system may switch to a resource savings mode and hold, reduce or block data transmission and data synchronization to limit the resources being utilized. For example, some devices, such as portable devices, can further limit the number of synchronization events that occur to preserve device battery life. Ire another example, the system 100 can specify a synchronization event for a portable device according to minimum power level (e.g., transfer the synchronization information before the device powers off, loses communication capabilities, among other possibilities). In still another example, the system 100 can specify a synchronization event for a portable device based on a communication signal strength criteria (minimum sustained communication signal strength).

The log database 150 may receive the collected data from the monitoring engine 140, which may implicitly indicate which object in the users network may be currently being used or accessed by the user. Moreover, the log database 150 may develop a user history, for example, indicating that a user of the device 110 has watched two episodes of a television series two weeks in a row using the device 110. This data may be stored in the log database 150 along with the data related to the other current and past activities of the user and the device 110. In the log database 150, the data may be managed to a level of quality (measured in terms of accuracy, availability, usability, and resilience). Alternatively or in addition, the historical statistical data may be stored in a central log database 115 in the cloud 105, which may be connected to the device 110 via the prediction engine 160. In one implementation, the central log database may store logs from multiple devices (e.g., the device 120 and/or 130) in the system 100. In some implementations, the central log database and the log database 150 may be integrated into a single database, which can be combined with the device 110.

In one implementation, the monitoring engine 140 and the log database 150 may interoperate with the prediction engine 160 by monitoring user activity and system information at the device 110, as well as tracking user activity and system information in the form of historical statistics that are stored in the log database 150. In another example system, the monitoring engine 140 and the prediction engine 160 may be capable of connecting to each other directly. Alternatively or in addition, the prediction engine may be connected to a central prediction engine 125.

The prediction engine 160 may anticipate desired synchronizations of certain objects (e.g., content) between the device 110 and other devices (e.g., the devices 120 and 130) associated with the user of the device 110. In one implementation, the prediction engine 160 may generate predictive selections of content that would be desirable to the user at various devices. The generation of the predictive selections may involve making inferences based on various factors, such as previous content that was provided to the devices, and/or information provided in status information of the system 100. Further, making such inferences may involve the employment of one or more heuristics, which may be weighted in various ways, and/or data mining algorithms, which may be a set of heuristics and calculations that may create a data mining model from the data received from the log database 150. To create a model, the algorithm may first analyze the data provided by the log database 150 and determine specific types of patterns or trends. The algorithm may use the results of this analysis to define the optimal parameters for creating the mining model. These parameters may then be applied across the entire data set to extract actionable patterns and detailed statistics. Moreover, the prediction engine 160 may assign priority levels to objects (e.g., content) that are predictively selected. In some implementations, the prediction engine 160 may assign priority levels dynamically based on the attributes.

In another implementation, the generation of predictive selections of content may be performed at the central prediction engine 125 as an alternative or addition to the prediction engine 160 in the device 110. The central prediction engine 125 may receive data related to the user behavior across al devices (e.g., devices 110, 120 and 130) and system 100 from the log database 150 and the central log database 115, and generates predictive selections of content. Such predictive selections of content may be communicated to the prediction engine 160 or other associated local prediction engines.

In one implementation, the synchronization information can be propagated from the prediction engine 160 to the other devices, e.g., the devices 120 and 130 through a central source, e.g., the cloud 105. In other implementations, the synchronization information can be propagated from the device 110 directly to the device 120 and/or the device 130 without the need for a central source.

Alternatively or in addition to the synchronization of content, the system 100 may propagate content by distributing data from one to another device. In one implementation, such distribution may be managed according to propagation rules.

In one implementation, the prediction may be based on output habits (e.g., viewing and/or listening habits) on a specific device. For instance, increased outputting of content in a particular category or type at a particular device may result in selecting further content of similar category or type for synchronizing with that device. For example, if the device 120 user watches three or more episodes of shows of the same genre (e.g., situation comedies) on the device 120, recently recorded episodes in that genre may be selected and synchronized to the device 120.

In another implementation, the prediction may involve outputting (e.g., viewing and/or listening) habits across devices. For instance, viewing of particular content by a user of the device 110 may result in the selection of the same content for synchronizing with the device 120 based on the prediction that the user, who started viewing the content at the device 110, may choose to continue viewing that particular content at the device 120. For example, if a user of the device 110 (e.g. desktop computer) starts viewing a movie on the device 110, but pauses half way, the prediction engine 160 may conclude that the user may continue watching the movie at the device 120 (e.g., laptop). Accordingly, that movie file may be selected to be synchronized to the device 120.

As another example, as discussed above, a user of the device 110 may listen to two podcasts of a podcast series for two weeks in a row using the device 110. Based on such user behavior, the prediction engine 160 (based on the user history) may select the third podcast of the same series to be synchronized to the device 110 on the third week. As a further example, a user may browse a set of word files in a "My Project" folder in the device 110. The user may then start up a word processing application and begin to make edits to a particular file in the folder. By receiving this user activity data from the log data 150, the prediction engine 160 may infer that other files in the folder may also be accessed and/or edited by the user. Accordingly, the files in the folder may be selected to be synchronized.

In further implementations, the prediction may explicit user ratings of content (which may be inputted and received from user of the devices 110, 120 and 130). For instance, high user ratings of content on a specific device may cause the selection of similar content for synchronization with that specific device. For example, if a user rates two books highly in the "Books" folder at the device 110, other books may be selected to be synchronized.

In still further implementations, the prediction may be based on previous synchronization activities. For instance, previously synchronized content within a particular category and/or time interval with a specific device may cause the selection of similar content for synchronization with that specific device. As an example, if the device 120 user has explicitly synchronized photos three times from the same folder within two days of uploading the photos onto the device 110, subsequent uploads of photos onto that same folder at the device 110 may be selected to be synchronized.

In some implementations, the prediction may involve a user's search behavior. For instance, searching for a file at a specific device may result in the selection of the content of the search results for synchronization to another device. If a user of the device 110 searches for a wedding picture in a "My Pictures" folder at the device 110, the device 110 may display a list of files that are identified as wedding pictures in the "My Pictures" folder. The user may or may not open these files to view the pictures at the device 110. Regardless, the wedding pictures identified as the search results at the device 110 may be selected to be synchronized to the device 120 based on the prediction that the user may want to view the images at the device 120.

In another implementation, a list of search results may be influenced by data related to a user's behavior at a device. For example, a user's behavior may show that the user frequently listens to audio files at the device 110. Accordingly, the prediction engine 160 may assign higher priority to audio files at the device 110 based on the prediction that the user may access those files. If the user runs a search for the search keyword "birthday" at the device 120, the search results may list the audio files identified under the keyword "birthday" above images or word documents identified under the keyword "birthday" based on the higher priority given to the audio files at the device 110. The prediction engine 160 selects the audio files identified under the keyword "birthday" to be synchronized to the device 110.

The aforementioned prediction criteria are provided as examples, and not limitations. Accordingly any number of criteria, algorithms or any other method alone or in any combination or weighting may be employed. As discussed above, predictive selections of content may be generated by the prediction engine 160 and/or the central prediction engine 125.

In other implementations, a synchronization event may be determined also based on one or more inputs associated with the device (e.g., power levels, wireless communication network strength, motion sensors, timers, activation of headphones/speakers, etc.). For instance, activation of a headphone on a specific device may result in the selection of audio content for synchronization. For example, if the device 110 user has activated a headphone on the device 110, audio files in a "My Music" folder may be selected to be synchronized. As another example, a user may perform an activity that may be computationally expensive and make take a lot of disk access or file system operations. For example, the user may be editing videos or recalculating a large spreadsheet using one or more applications. The prediction engine 160 may then lower the priority of those objects so that the synchronization operations do not put additional pressures on system resources which may already be being consumed at a high level.

Moreover, in one implementation, upon receipt of incoming synchronization information, the prediction engine 160 in the device 110 can incorporate additional synchronization information collected on that specific device, filter inconsistent information and/or perform other conflict resolution.

The object receiver 170 may be a component for obtaining objects based on synchronization information from various devices in the user's network such as the devices 120 and 130. In another implementation, the object receiver 170 may obtain objects from various content providers through a communications medium.

The object database 180 may receive and store objects (e.g., content) from the object receiver 170. For example, a synchronization operation may occur between the devices 110, 120 and 130 when the devices 110, 120 and 130 are available to each other. This may include content stored by the device 110 being copied into a storage medium within the device 120 and/or the device 130. Moreover, it may also include content stored by the device 120 being copied into a storage medium within the device 110 (e.g., the object database 180) and/or the device 130. Lastly, it may also include content stored by the device 130 being copied into a storage medium within the device 110 (e.g., the object database 180) and/or the device 120.

In one implementation, in addition to the objects discussed above, contextual information or dynamic attributes such as, device location, device type and any arbitrary attribute values with the central reference point may also be stored in the object database 180. Other dynamic attributes may include client operating system, client locale, client device type, city, state abbreviation, zip code, language code, country code, area code, phone number, telephone country access code or the like.

In one implementation, the object, database 180 may delete objects. Such deletions may be performed upon the occurrence of one or more conditions. Exemplary conditions include, the content being stored in the object database 180 for longer than a predetermined time threshold (e.g., emails in a trash folder), a user manually selecting content to be deleted, the content having already been outputted (e.g., viewed) by a user, and/or receipt of an instruction from another device to delete the content. Examples are not limited to these examples.

The object sender 190 associated with the device 110 may transmit objects to one or more devices (e.g., the devices 120 and 130) known to the device 110 and eligible to receive the synchronization information. For example, peer devices associated with the same user or user account may be considered eligible to receive content. In one implementation, the object sender 190 may navigate the transmission of the objects. In one implementation, the object sender 190 may transmit the objects to the receiving devices such as the device 120 or 130 directly. In another implementation, the object sender 190 may transmit the objects to the receiving devices via the cloud 105.

The object transmissions may be queued based on the device that the objects are to be delivered to. Each queue may be associated with a device and represent one or more objects to be delivered to the associated device. Such queue may be called a peer queue. In one implementation, a queue may be serviced for processing based on the synchronization priority assigned to the associated device. The device numbers could be represented, for example, by a numeric value, such as 1, 2 . . . N. Synchronization priorities may also be represented by a numeric value with higher values indicating higher priority for processing and lower values indicating lower priority. For example, a desktop computer may have a higher priority than a mobile device based on, for example, the processing speed of the device. Thus, the objects to be delivered to a device with higher priority may get processed before the objects that are to be delivered to a device with lower priority. Moreover, as mentioned above, each queue contains one or more objects. The objects within each queue may be ranked based on synchronization priorities that are associated with the objects. For example, an image file may have a higher priority than a video file for reasons that are discussed in detail above with respect to the prediction engine 160.

In some implementations, a prioritization manager may assign the synchronization priorities (e.g., priority levels) to each object and each device. Moreover, the prioritization manager may modify the priority level of each object and each device based on the monitored information from the monitoring engine 140.

In one implementation, the system 100 may include an external data source interface component for obtaining external information from network-based resources, such as information corresponding to a user associated with the device 110 or selected receiving devices such as the devices 120 and 130. Alternatively or in addition, as discussed above in more detail, the device 110 may include a data processing component for processing the synchronization information obtained from the other devices. The data processing component may also determine one or more devices that may be receiving devices for specific synchronization information and, as appropriate, to determine specific subsets of the synchronization information each receiving device may receive. The objects stored by the object database 180 may be utilized by the data processing component.

The system 100 and device 110 may include a number of additional components, systems and/or subsystems for facilitating communications with the other wireless or wired devices and/or the cloud 105. The additional components can include one or more mobile switching centers for establishing communications with the wireless devices via the wireless communication network, such as a cellular radio access network, a wireless network based on the family of IEEE 802.11 technical standards ("WiFi"), a wireless network based on IEEE 802.16 standards ("WiMax"), and other wireless networks. The mobile switching center may include interfaces for establishing various communications via a communication network, such as the Internet, intranets, private networks and point-to-point networks, generally referred to as the "network."

The device 110 may be implemented using any suitable combination of hardware and/or software. For example, in one implementation, the device 110 may comprise at least a processing device and a memory. The processing device may correspond to a device that generally retrieves and executes the instructions stored in the memory (e.g., a central processing unit (CPU), processor, microcontroller, or the like). The memory may correspond to any typical storage device that stores computer-implemented instructions. The device 110 may perform functions by using the processing unit(s) to execute instructions provided by the system memory. Further, the memory may store information that provides an operating system component, various program modules, program data, and/or other components. In another implementation, the device 110 may include storage media or machine-readable articles, which may include, for example, any suitable type of memory unit, memory device, memory article, memory medium, storage device, storage article, storage medium and/or storage unit, for example, memory, movable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The storage medium may store an instruction or a set of instructions that, if executed by a machine, may cause the machine to perform a method and/or operations in accordance with the implementations. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language. The device 110 may also include one or more input devices (keyboard, mouse device, specialized selection keys, etc.) and one or more output devices (displays, printers, audio output mechanisms, etc.).

Figure 2:
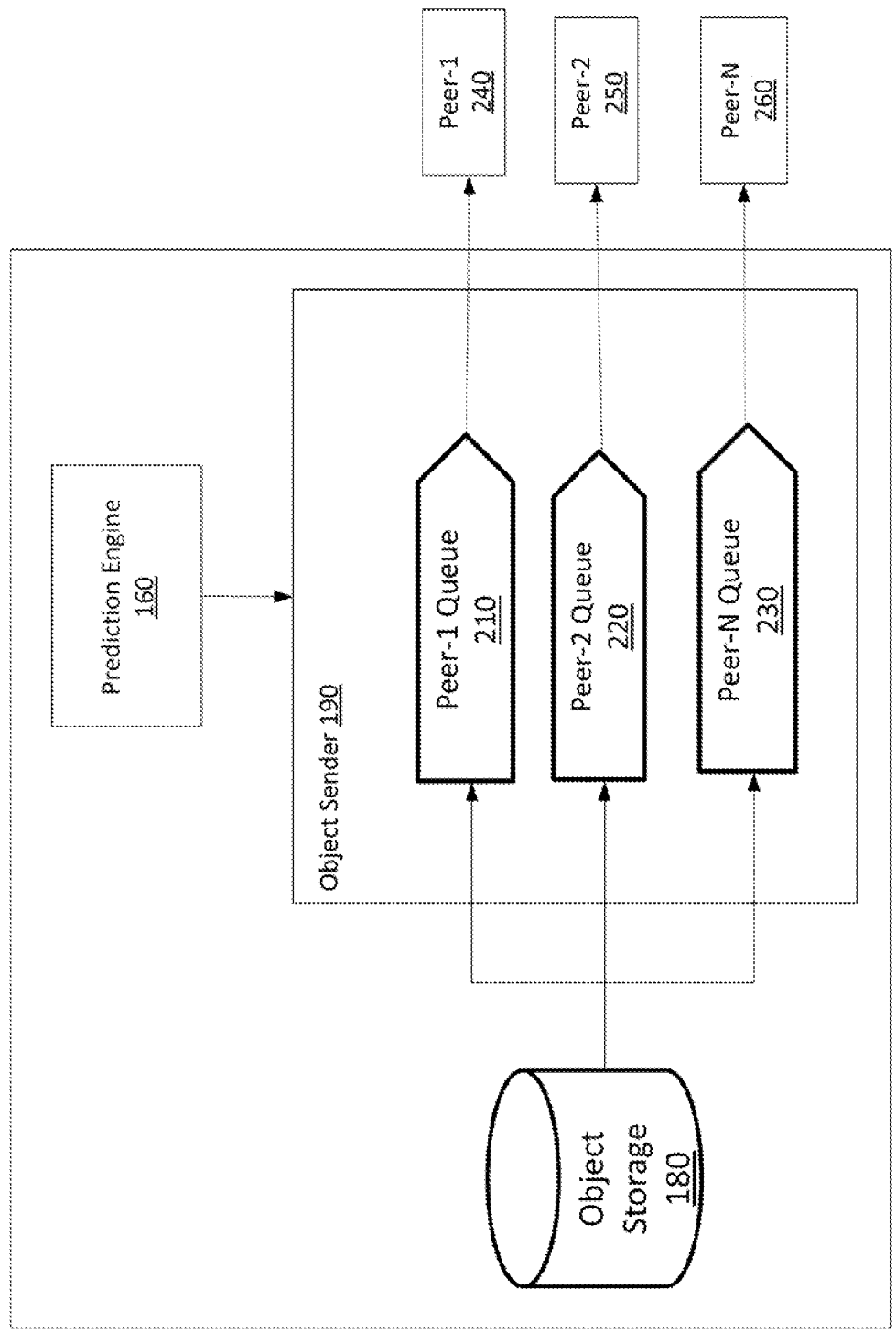
FIG. 2 illustrates an object sender of an example system in accordance with an implementation.

FIG. 2 illustrates example components of the system 100 in accordance with an implementation. The object sender 190 comprises a peer-1 queue 210, peer-2 queue 220, and peer-N queue 230, each of which is described in greater detail below. Each peer queue is fed into an associated device and represents a group of objects to be transmitted to the associated device. For example, peer-1 240 may be a desktop computer, and peer-1 queue 210 may be a group of objects that are lined up to be transmitted to the desktop computer. Such objects may include content such as files, patches, graphics, and or the like. The files may include videos, audios and/or text. As described above in more detail with respect to FIG. 1, the object transmissions may be queued based on the device that the objects are to be delivered to, and a peer queue may be serviced for processing based on the synchronization priority assigned to the associated device. Alternatively or in addition, as also described above in more detail with respect to FIG. 1, the objects are lined up based on synchronization priorities that are associated with the objects.

In one implementation, the synchronization priority assignment may be based on content consumption behavior, active application used on the device to identify file types, information related to the mostly recently reviewed content on another device, priority time to synchronization content.

For example, the peer-1 240 may be a desktop computer, and the peer-2 250 may be a laptop, and the peer-N 230 may be a mobile device. The peer-1 240 may have a higher priority than the peer-2 250 and the peer-N 230 based on the speed of its processor. The desktop computer with the faster processor may have a higher priority because the peer-1 240 may have sufficient resources to synchronize large sets of objects, which may be more desirable to a user. Accordingly, the peer-1 queue 210 may be processed before the peer-2 queue 220 and the peer-N 230 queue.

The device numbers could be represented, for example, by a numeric value, such as 1, 2 . . . N. Synchronization priorities (not shown in FIG. 2) may also be represented by a numeric value with higher values indicating higher priority for processing and lower values indicating lower priority.

It should be readily apparent that the object sender 190 illustrated in FIG. 2 represents a generalized depiction and that other components may be added or existing components may be removed, modified, or rearranged without departing from a scope of the present disclosure. While FIG. 2 illustrates that the object sender 190 includes three queues, peer-1 queue 210, peer-2 queue 220 and peer-N queue 230, the system may actually comprise less or more number of queues. Three queues have been shown and described as an example implementation. Moreover, while FIG. 2 illustrates that the object sender 190 includes three devices, peer-1 queue 210, peer-2 queue 220 and peer-N queue 230, the system may actually comprise less or more number of devices peer-1 240, peer-2 250 and peer-N' 260. The number N in FIG. 2 illustrates that there may be a series of queues and devices in an object sender in accordance with an implementation.

Figure 3:
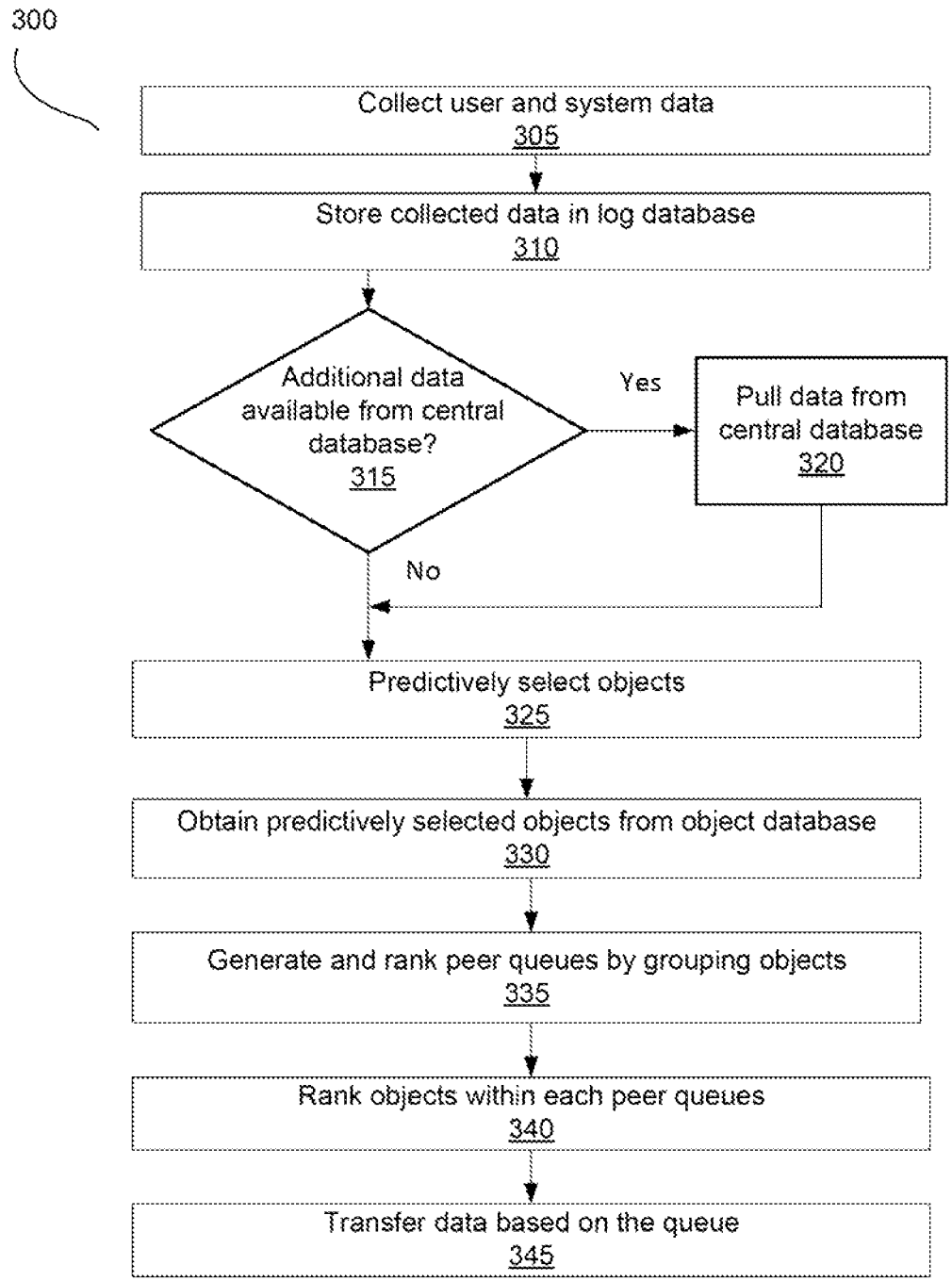
FIG. 3 illustrates an example process flow diagram in accordance with another implementation.

Turning now to the operation of the system 100. FIG. 3 illustrates an example process flow diagram 300 in accordance with an implementation. More specifically, illustrative process presents a "push" model for generating predictive selection of objects and transmitting the objects based on synchronization priorities. It should be readily apparent that the processes depicted in FIG. 3 represents generalized illustrations, and that other processes may be added or existing processes may be removed, modified, or rearranged without departing from the scope and spirit of the present disclosure. Further, it should be understood that the processes may represent executable instructions stored on memory that may cause a processing device to respond, to perform actions, to change states, and/or to make decisions. Thus, the described processes may be implemented as executable instructions and/or operations provided by a memory associated with a computing device, such as the device 110 as illustrated in FIGS. 1 and 2. Furthermore, FIG. 3 is not intended to limit the implementation of the described implementations, but rather the figure illustrates functional information one skilled in the art could use to design/fabricate circuits, generate software, or use a combination of hardware and software to perform the illustrated processes.

The process 300 may begin at block 305, where the monitoring engine 140 monitors user activity and device information at the device 110. This process may include collecting, data related to content requested, content received, content outputted, application utilized, available storage capacity, network availability, network speed, network cost, battery capacity, charging status, location of the device, etc. In one implementation, the process of monitoring may entail collecting data related to all the user activities and device information. In another implementation, the process of monitoring may be executed based on a predetermined protocol such as pre-identified conditions or categories of data. For example, the monitoring engine 140 may be set to collect data related to activities that the user performs for duration of more than one minute, and any activities that the user spends less than one minute on may be disregarded. Moreover, the monitoring engine 140 may perform filtering actions to identify a subset of the collected data and provide only the subset that the user may need.

At block 310, the collected data related to the user activities and device information may be provided to the log database 150 to be recorded. The log database 150 may store the records and depending on the implementation, may organize the data and generate correlations between various types of data. In one implementation, relational database structure may be used for organization of the data. That is, the data is collected into tables, and related pieces of data may be grouped together in a single structure or record, and relationships can be defined between these structures and records. Such structures and records may be made available to the prediction engine 160, which pulls the stored data from the log database 150 and examine the data for further analysis. As discussed above with respect to FIG. 1, in one implementation, the data from the log database may be transmitted to the central log database 115. The central log database 115 consolidates and stores all the data received from the devices in the network (e.g. the devices 110, 120 and 130).

At block 315, the prediction engine 160 may determine whether there is additional data that may be considered from the central log database. If additional data is identified, at block 320, such data may be acquired. At block 325, the prediction engine anticipates and predictively selects objects (e.g., content) that the prediction engine 160 determines to be desirable to the user. The process of predictive selections may involve pulling data from the log database 150 and performing data analytics to interpret the data. As described above with respect to FIG. 1, the prediction engine may create a prediction rule that predicts future demand for objects based on various factors, such as the user's historical data consumption patterns.

At block 330, the predictively selected objects are obtained from the object database 180. At block 335, the object sender 190 generates queues by grouping the selected objects in queues based on the devices that the objects are being transmitted to. For example, if an object a is to be transmitted to peer-1 240 (as illustrated in FIG. 2), the object a may be grouped in the peer-1 queue 210. Similarly, if an object b is to be transmitted to peer-2 250 (as illustrated in FIG. 2), the object b may be grouped in the peer-2 queue 220. In one implementation, there may be multiple objects that are to be transmitted to the same device. For example, in addition to the object a, objects c and d may also be set to be transmitted to the peer-1 240. Accordingly, the objects c and d may be grouped in the peer-1 queue 210 along with the object a. In that situation, at block 340, the process of grouping may also comprise ranking the objects a, b and c based on their synchronization priorities. For example, the object a may have a higher priority than objects b and c. Accordingly, object a may be set to be synchronized first and transmitted to the peer-1 before the objects b and c.

At block 345, the process of transmitting objects may start by processing the queue with the highest synchronization priority. For example, the peer-1 queue 210 may have a higher priority than peer-2 queue 220 and/or peer-N queue 230. Accordingly, the object sender 190 initiates the process of object transmission by processing the peer-1 queue 210 first. As discussed in more detail above with respect to FIG. 2, the synchronization priority of each queue may be based on the synchronization priority assigned to the device associated with the queue. For example, the synchronization priority of the peer-1 queue 210 may be determined based on the synchronization priority of the peer-1 240.

In one implementation, the synchronization priority of the peer queue may be adjusted based on certain data monitored by the monitoring engine 140. As discussed in detail above with respect to FIG. 1, the monitoring engine 140 may monitor various attributes of the device 110, including battery power information, battery power consumption rates, memory/storage space, wireless signal strength, network details, and/or alike. Based on data related to such attributes, the prediction engine 160 may conclude that the resources of the device 110 are being heavily utilized. For example, the monitoring engine 140 may detect that the battery of the device 110 is low, the network bandwidth is limited, and the network traffic is subject to billing (e.g., 3G or roaming). Accordingly, the prediction engine 160 may issue commands to hold, reduce or block transmission of objects to limit the usage of resources. In one implementation, the prediction engine 160 may lower the synchronization priority of the peer queues and/or the objects within such queues that may require, for example, more battery power, network bandwidth and/or storage space. In another implementation, the system may have the synchronization manager blocking the synchronization operations in accordance with commands from the prediction module 160 to block the synchronization based on battery power information, battery power consumption rates, storage space, wireless signal strength, and network details.

In another implementation, after determining the peer-1 queue 210 has the highest synchronization priority based on the peer-1 240 associated with that queue, the device 110 may determine whether the peer-1 240 is available to the device 110. If so, the queue may be processed and the object is synchronized (e.g., copied) to the peer-1 240. However, if the device is not available, then the device 110 may prompt the user to make the device available. This prompting may be performed through a user interface (e.g., a display) of the device and/or of an output device connected to the device. Once the peer-1 240 is available, the queue can be processed.

Figure 4:
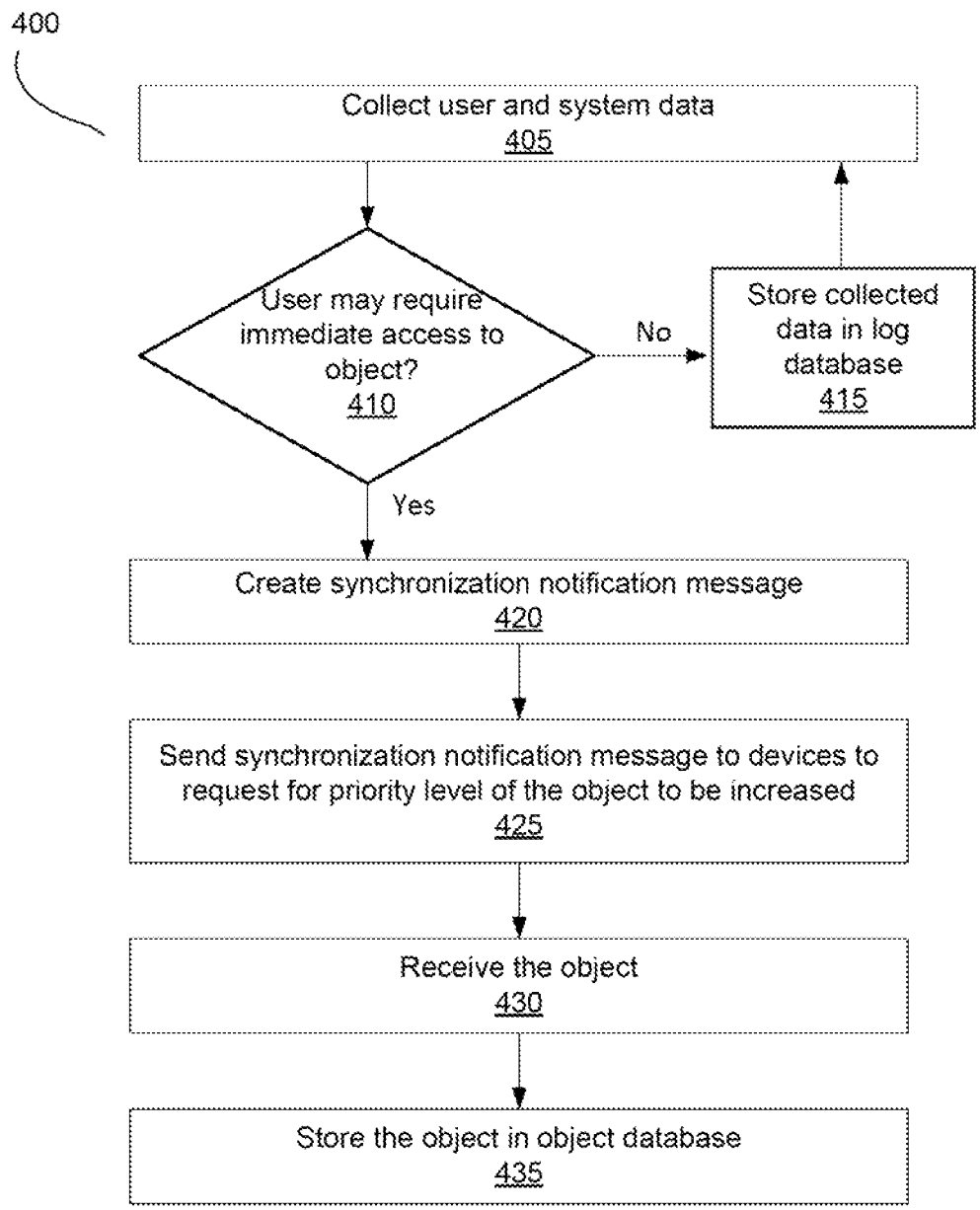
FIG. 4 illustrates an example process flow diagram in accordance with an implementation.

FIG. 4 illustrates another example process flow diagram 400 in accordance with another implementation. More specifically, illustrative process corresponds to a "pull" model for receiving objects from devices in a network for synchronization. For example, the device 110 can transmit a request, or initiate a transaction, that results in the downloading or streaming of objects (e.g., content) to the device 110. Typically, the content providing device would initiate the transfer upon receipt of the request from the device 110. It should be readily apparent that the processes depicted in FIG. 4 represents generalized illustrations, and that other processes may be added or existing processes may be removed, modified, or rearranged without departing from the scope and spirit of the present disclosure. Further, it should be understood that the processes may represent executable instructions stored on memory that may cause a processing device to respond, to perform actions, to change states, and/or to make decisions. Thus, the described processes may be implemented as executable instructions and/or operations provided by a memory associated with a computing device, such as the device 110 as illustrated in FIGS. 1 and 2. Furthermore, FIG. 4 is not intended to limit the implementation of the described implementations, but rather the figure illustrates functional information one skilled in the art could use to design/fabricate circuits, generate software, or use a combination of hardware and software to perform the illustrated processes.

The process 400 may begin at block 405, where the monitoring engine 140 monitors user activity and device information at the device 110. At block 410, the monitoring engine 140 determines whether any of the monitored activity or system information indicates that a user of the device 110 may require immediate access to certain objects (e.g., content). In particular, this process may involve, e.g., performing a discovery process, during which the monitoring device may detect that some user activity indicates a need for an immediate access to an object, which may be a specific file or a set of files. For example, the user may navigate to a specific folder of content, in which case the monitoring engine 140 may interpret this activity as an indication for an upcoming request to access the files within that specific folder. Other example may include, but not limited to, user opening a specific application, connecting to a specific LAN connection, and searching for a specific file.

If it is determined that the user of the device 110 may require immediate access to the object, the synchronization process may be initiated by the prediction engine 160. At block 420, the prediction engine 160 creates a synchronization notification message. The synchronization notification message may identify the object (e.g. the specific file or the set of files), indicate that the object needs to be synchronized to the device 110 and include a request to pull content. Moreover, the synchronization notification message may request for the synchronization priority associated with the object to be modified at the devices.

At block 425, the prediction engine 160 sends the synchronization notification message to the other devices associated with the user or user account. In particular, this process may involve identifying any devices associated with the user or user account and determining whether any of associated devices may have a newer version of the object. For example, the object to be synchronized may be a digital publication file. The prediction engine 160 may specify that the devices 120 and 130 are associated with the user of the device 110 or user account, and that the devices 120 and 130 might have a copy of the object (possibly in a different format) corresponding to the digital publication file. Accordingly, the prediction engine 160 may send the synchronization notification message to the device 120 and 130. In another implementation, the central prediction engine 125 may transmit the synchronization notification message to the devices associated with the user or user account indicating that the object is needed to be synchronized.

In one implementation, when synchronization notification message is received, the request is preferably confirmed by a central reference point to verify that the request came from a valid device. This check preferably validates security information embedded in a message header or the like. This security information is preferably encrypted employing a key that only a valid device and server possess. However, any number of verification techniques may be used, such as public key encryption, digital signature certificates and/or the like, if desired. If the request is invalid, an error response is preferably sent back to the device sending the message (i.e., the device 110), indicating the device is not authorized to use the synchronization framework.

In response to the synchronization notification message, the devices 120 and 130 process the notification. This process may involve determining whether a copy of the object exists in the object databases in, the devices 120 and 130. If confirmed that the object exists, the synchronization priority associated with the object is increased at the device that the object exists in (e.g., the device 120, or the device 130 or both devices), and in accordance with its own configuration settings and network availability, at block 430, the device transmits the object to the device 110. At block 425, the object is received at the object receiver 170 in the device 110. In some implementations, the transmission may be performed directly from one device to another. In another implementation, the transmission of the object may be performed through the cloud 105.

In one implementation, the transmission of the object to the device 110 may be blocked or put on hold based on certain data monitored by the monitoring engine 140. As discussed in more detail above with respect to FIG. 1, the monitoring engine 140 may monitor various attributes of the device 110, including battery power information, battery power consumption rates, memory/storage space, wireless signal strength, network details, and/or alike. Based on data related to such attributes, the prediction engine 160 may conclude that the resources of the device 110 are being heavily utilized. For example, the monitoring engine 140 may detect that the battery of the device 110 is low, the network bandwidth is limited, and/or the network traffic is subject billing (e.g., 3G or roaming). Accordingly, the prediction engine 160 may issue commands to hold or block the transmission of the object to limit the usage of resources.

At block 435, the object may be stored in the object database of the device 110. In one implementation, the devices 120 and 130 may store the synchronization notification message in the log databases in the devices 120 and 130, and may use such information to improve the historical synchronization data in each database. Moreover, in another implementation, the device 110 may perform conflict resolution of synchronization information received from multiple devices.

While the above disclosure has been shown and described with reference to the foregoing examples, it should be understood that other forms, details, and implementations may be made without departing from the spirit and scope of the disclosure that is defined in the following claims.

What is claimed is:

1. A method for synchronizing data, comprising:
   monitoring, by a system comprising a processor, a set of attributes at a plurality of devices of a user;
   selecting, by the system, a group of data objects for synchronization based on the monitored set of attributes, and based on previous user activity of the user across the plurality of devices;
   assigning, by the system, priority levels to the data objects of the group of data objects and to the plurality of devices;
   prioritizing, by the system, synchronization operations to be performed on the group of data objects based on the priority levels; and
   synchronizing, by the system, the group of data objects in accordance with the prioritization of the synchronization operations.

2. The method of claim 1, wherein the set of attributes comprises static and dynamic attributes.

3. The method of claim 2, wherein the dynamic attributes comprise the previous user activity, operations and actions of the plurality of devices, battery power information of the plurality of devices, battery power consumption rates of the plurality of devices, storage space of the plurality of devices, and wireless signal strengths of the plurality of devices.

4. The method of claim 1, wherein assigning the priority levels to the data objects of the group of data objects and the plurality of devices comprises assigning the priority levels dynamically based on the monitored set of attributes.

5. The method of claim 1, further comprising issuing commands to block the synchronization operations based at least in part on at least one of battery power information, battery power consumption rates, storage space, or wireless signal strength.

6. The method of claim 1, wherein monitoring the set of attributes at the plurality of devices comprises:
   collecting groups of information associated with the set of attributes, each group of information identifying a device on a network; and
   analyzing the collected groups of information.

7. The method of claim 1, wherein selecting the group of data objects based on the monitored set of attributes for synchronization comprises predicting the group of data objects having a likelihood of being requested by the user.

8. The method of claim 1, wherein selecting the group of data objects based on the monitored set of attributes for synchronization comprises:
   using the previous user activity to predict data objects having a likelihood of being requested by the user.

9. The method of claim 1, wherein prioritizing the synchronization operations to be performed on the group of data objects based on the priority levels comprises:
   storing, in a first queue of a first device having a first priority level, selected data objects to be transmitted to the first device;
   storing, in a second queue of a second device having a second priority level, selected data objects to be transmitted to the second device, wherein the second priority level is higher than the first priority level; and
   prioritizing synchronization operations of the second queue over the first queue based on the second priority level being higher than the first priority level.

10. The method of claim 1, wherein the set of attributes indicates an immediate request to access certain data on a certain device.

11. A system comprising:
    a processor; and
    a non-transitory storage medium storing instructions executable on the processor to:
       monitor a set of attributes at a plurality of devices of a user;
       select a group of data objects for synchronization based on the monitored set of attributes, and based on previous user activity of the user across the plurality of devices;
       assign priority levels to the data objects of the group of data objects and to the plurality of devices;
       prioritize synchronization operations to be performed on the group of data objects based on the priority levels; and
       synchronize the group of data objects in accordance with the prioritization of the synchronization operations.

12. The system of claim 11, wherein the instructions are executable on the process to block the synchronization operations in accordance with at least one of battery power information, battery power consumption rates, storage space, or wireless signal strength.

13. A non-transitory computer-readable medium comprising instructions which, when executed, cause a device to:
    monitor a set of attributes at a plurality of devices belonging to a user;
    select a group of data objects for synchronization based on the monitored set of attributes, and based on previous user activity of the user across the plurality of devices;
    prioritize synchronization operations to be performed on the group of data objects based on a priority level assigned to each data object of the group of data objects and each device of the plurality of devices; and
    synchronize the group of data objects in accordance with the prioritization of the synchronization operations.

14. The method of claim 1, wherein the previous user activity comprises the user viewing a first data object at multiple devices of the plurality of devices at different times.

15. The method of claim 14, wherein prioritizing the synchronization operations comprises setting a synchronization operation of a given data object of the group of data objects across the multiple devices at a higher priority than another synchronization operation of another data object.

16. The method of claim 14, wherein the previous user activity comprises the user initially viewing the first data object at a first device of the multiple devices, pausing viewing of the first data object at the first device, and continuing viewing of the first data object at a second device of the multiple devices.

17. The method of claim 1, wherein the previous user activity comprises the user performing a search at a first device of the plurality of the devices and viewing a result of the search at a second device of the plurality of the devices, and wherein prioritizing the synchronization operations comprises setting a synchronization operation of a given data object of the group of data objects from the first device to the second device at a higher priority than another synchronization operation of another data object.

18. The system of claim 11, wherein the previous user activity comprises the user viewing a first data object at multiple devices of the plurality of devices at different times, and wherein the selected group of data objects comprises data objects to be synchronized across the multiple devices.

19. The non-transitory computer-readable medium of claim 13, wherein the previous user activity comprises the user viewing a first data object at multiple devices of the plurality of devices at different times, and wherein the selected group of data objects comprises data objects to be synchronized across the multiple devices.

* * * * *